(12) United States Patent
McElvain (10) Patent No.: US 8,189,237 B2
(45) Date of Patent: May 29, 2012

(54) DISTRIBUTING A SRE CODES IN HALFTONE PIXELS PATTERN IN SUPERCELL

(75) Inventor: Jon McElvain, Manhattan Beach, CA (US)

(73) Assignee: Xerox Corporation, Norwalk, CT (US)

( * ) Notice: Subject to any disclaimer, the term of this patent is extended or adjusted under 35 U.S.C. 154(b) by 599 days.

(21) Appl. No.: 11/642,027

(22) Filed: Dec. 19, 2006

(65) Prior Publication Data

US 2008/0144057 A1    Jun. 19, 2008

(51) Int. Cl.
*H04N 1/40* (2006.01)
*G06K 15/00* (2006.01)

(52) U.S. Cl. ...... 358/3.1; 358/3.01; 358/3.02; 358/3.06; 358/3.11; 358/3.12; 358/3.3

(58) Field of Classification Search .................. None
See application file for complete search history.

(56) References Cited

U.S. PATENT DOCUMENTS

| | | | |
|---|---|---|---|
| 5,515,456 A | 5/1996 | Ballard | |
| 5,542,031 A | 7/1996 | Douglass et al. | |
| 5,745,249 A | 4/1998 | Crean et al. | |
| 5,949,966 A * | 9/1999 | Hayashi | 358/1.9 |
| 5,987,221 A | 11/1999 | Bearss et al. | |
| 6,104,812 A | 8/2000 | Koltai et al. | |
| 7,180,554 B2 | 2/2007 | Divelbiss et al. | |
| 2003/0112507 A1 | 6/2003 | Divelbiss et al. | |
| 2003/0223102 A1 | 12/2003 | Thor et al. | |
| 2004/0218825 A1 * | 11/2004 | Graffagnino | 382/240 |
| 2005/0117774 A1 * | 6/2005 | Moroo et al. | 382/100 |
| 2005/0259844 A1 * | 11/2005 | Kot et al. | 382/100 |
| 2006/0017978 A1 * | 1/2006 | Minamino | 358/3.03 |
| 2006/0038822 A1 * | 2/2006 | Xu et al. | 345/555 |
| 2006/0181737 A1 * | 8/2006 | Kakutani | 358/3.03 |
| 2008/0117980 A1 * | 5/2008 | Hung et al. | 375/240.24 |

FOREIGN PATENT DOCUMENTS

WO   WO97/34257   * 9/1997

* cited by examiner

*Primary Examiner* — Benny Q Tieu
*Assistant Examiner* — Haris Sabah
(74) *Attorney, Agent, or Firm* — Fay Sharpe LLP (57) ABSTRACT

A method is employed that represents patterns using a super resolution encoding method that distributes the code value among adjacent pixels. One or more blocks are created, wherein each block is comprised of a plurality of bits, the height of the block is equal to the width of the block. One or more supercells are created by merging at least two adjacent blocks. One or more patterns are defined, wherein each pattern is defined by selecting one or more bits to be one of filled or unfilled within each supercell. Each of the one or more patterns is associated with an SRE code, the SRE code is related to the number and location of bits that are filled within the pattern. A pattern is defined with a plurality of patterns, each pattern is included in the one or more supercells.

19 Claims, 6 Drawing Sheets

DISTRIBUTING A SRE CODES IN HALFTONE PIXELS PATTERN IN SUPERCELL

BACKGROUND

The following relates to data delivery and encoding methods pertaining to pattern specification and rendering in display and printing devices. It finds particular application to distributing super-resolution encoding (SRE) "codes" among groups of pixels, forming a "super cell" for SRE specification which allows for a greater number of bits and therefore patterns to be used in a code specification.

Super-resolution encoding (SRE) refers to a rendering mode whereby a set of high resolution binary patterns can be generated from a lower resolution "code". In contrast to standard halftoning, where the binary pattern generated is dependent on the (s,f) position relative to the halftone dot cell, SRE is not spatially dependent, and allows for a maximum of $2^N$ unique rendering patterns for the associated sub-pixels, where N is the number of bits used to represent the code space. For N=8 bits, there is a total of 256 possible codes (and therefore patterns) that can be specified. SRE can be effective for improved rendering of text and line art, where edge accuracy is of particular importance. Certain printer devices allow for 2400×2400×1 SRE rendering, for example the Xerox DC8000, whereby each 600×600 dpi (8 bit) pixel is used to render a 4×4 binary pattern. In this case, there are $2^{16}$ possible patterns; however, only two hundred and fifty six are accessible due to the eight bit code limitation. For simple edge rendering applications, the two hundred and fifty six pattern space is usually sufficient to handle most cases of interest. On the other hand, for applications that use the SRE approach in more sophisticated ways, such as SRE halftoning (U.S. patent application Ser. Nos. 11/443,016 and 11/443,351), two hundred and fifty six patterns may be insufficient. In those cases substitution of the "next best" pattern is required, leading to sub-optimal rendering.

Zeck et al. (U.S. Pat. No. 6,020,979) describes a method to encode high resolution rendering patterns using eight bit codes specified at a lower resolution, known as "Super Resolution Encoding" (SRE). In contrast to standard halftoning, where the binary pattern generated depends on the contone level and the raster position relative to the halftone dot cell, SRE produces fixed patterns that are only dependent on the N-bit code specified.

Some Xerox printers support super resolution encoding/decoding. When a particular pixel tag (tag=3 for example) is passed, the SRE mode is activated for that pixel, and the contone data for that pixel is interpreted as a rendering code. There are 256 possible SRE codes, each of which will result in a different 4×4 bit pattern to be rendered. Therefore, a single 600×600 dpi 8 bit pixel can specify a 2400×2400 dpi binary rendering pattern.

Figure 1:
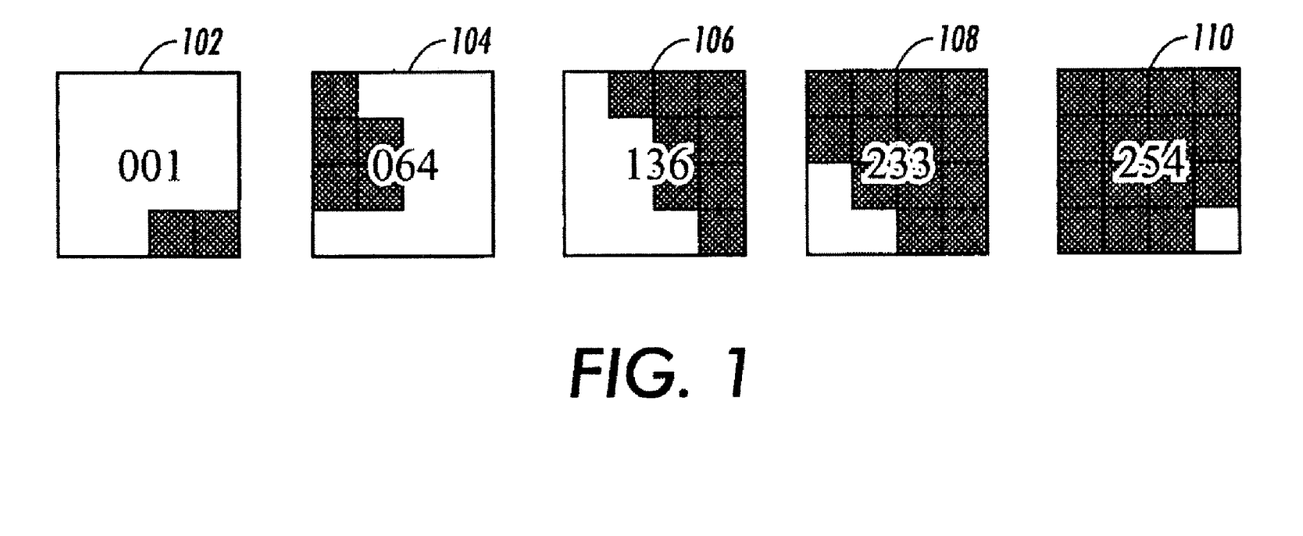
FIG. 1 illustrates several four bit patterns and their corresponding SRE codes in accordance with an exemplary embodiment.

FIG. 1 illustrates several examples of SRE patterns 102, 104, 106, 108, and 110 and their corresponding SRE codes. As illustrated, each SRE code is associated with a grid that is four bits wide by four bits high. The grid has one or more bits that are completely filled or not filled at all. In this embodiment, the bits are square shaped. However, it is to be appreciated that the bits can be substantially any shape used to tile a plane, such as rectangles, hexagons, etc.

The bit patterns 102-110 are four bits wide by four bits high, such that there are sixteen bits in each pattern. The bits are square shaped and the entire grid has a square shape. It is to be appreciated, however, that the grid can have substantially any shape. Each pattern has a corresponding SRE code.

In one example, bit pattern 110 has fifteen bits in the upper left hand corner that are completely filled wherein the lower right bit is not filled. This exemplary bit pattern is associated with SRE code 254. Substantially any pattern can be associated with substantially any SRE code.

There are $2^{16}$ (65,536) possible patterns for the 4×4 cell, although only 256 of these can be addressed due to the 8 bit code limitation. Such capability can improve the rendering of edges, corners, when used in conjunction with techniques such as anti-aliasing. In these simple applications, the 8 bit code limit is generally sufficient to produce the necessary patterns for improved edge-rendering.

U.S. patent application Ser. Nos. 11/443,016 and 11/443,351 propose a method whereby the SRE patterns are used as building blocks to construct high resolution halftones using low resolution code descriptions. In this approach, it was shown that high resolution dots (e.g., 2400×2400) could be well approximated using the two hundred and fifty six patterns available. For certain simple halftone dot geometries, such as 0 or 45 degree mono designs, the halftone can be exactly described in terms of the available SRE patterns. For more complex dots, however, pattern substitution is necessary, where the "next best" SRE pattern is chosen to approximate the actual pattern that would be rendered with the true 2400×2400 halftone dot. In these cases, sub-optimal rendering will occur, possibly resulting in objectionable artifacts such as contouring or moiré. What are needed are processes and/or systems that overcome these and other shortcomings associated with the representation of SRE patterns.

BRIEF DESCRIPTION

In one aspect, a method is employed that represents patterns using a super resolution encoding method that distributes the code value among adjacent pixels. One or more blocks are created, wherein each block is comprised of a plurality of bits, the height of the block is equal to the width of the block. One or more supercells are created by merging at least two adjacent blocks. One or more patterns are defined, wherein each pattern is defined by selecting one or more bits to be one of filled or unfilled within each supercell. Each of the one or more patterns is associated with an SRE code, the SRE code is related to the number and location of bits that are filled within the pattern. A pattern is defined with a plurality of patterns, each pattern is included in the one or more supercells.

In another aspect, a method is employed that renders a pattern suitable for use with a print engine. One or more blocks are created, wherein each block is comprised of a plurality of bits. One or more supercells are created by merging at least two blocks. One or more patterns are defined, wherein each pattern is defined by selecting one or more bits to be one of filled or unfilled within each supercell. Each of the one or more patterns is associated with an SRE code, the SRE code is related to the number and location of bits that are filled within the pattern. A pattern is defined with a plurality of patterns, each pattern is included in the one or more supercells.

In yet another aspect, a system creates patterns using a super resolution encoding method that distributes the code value among adjacent pixels. A block configuration element creates one or more blocks, wherein each block is comprised of a plurality of bits. A merge component creates one or more supercells by merging at least two blocks. A pattern store defines one or more patterns, wherein each pattern is defined by selecting one or more bits to be one of filled or unfilled within each supercell. An SRE code generator associates each of the one or more patterns with an SRE code, the SRE code is related to the number and location of bits that are filled within the pattern. A pattern rendering component defines a pattern with a plurality of patterns, each pattern is included in the one or more supercells.

DETAILED DESCRIPTION

Figure 2:
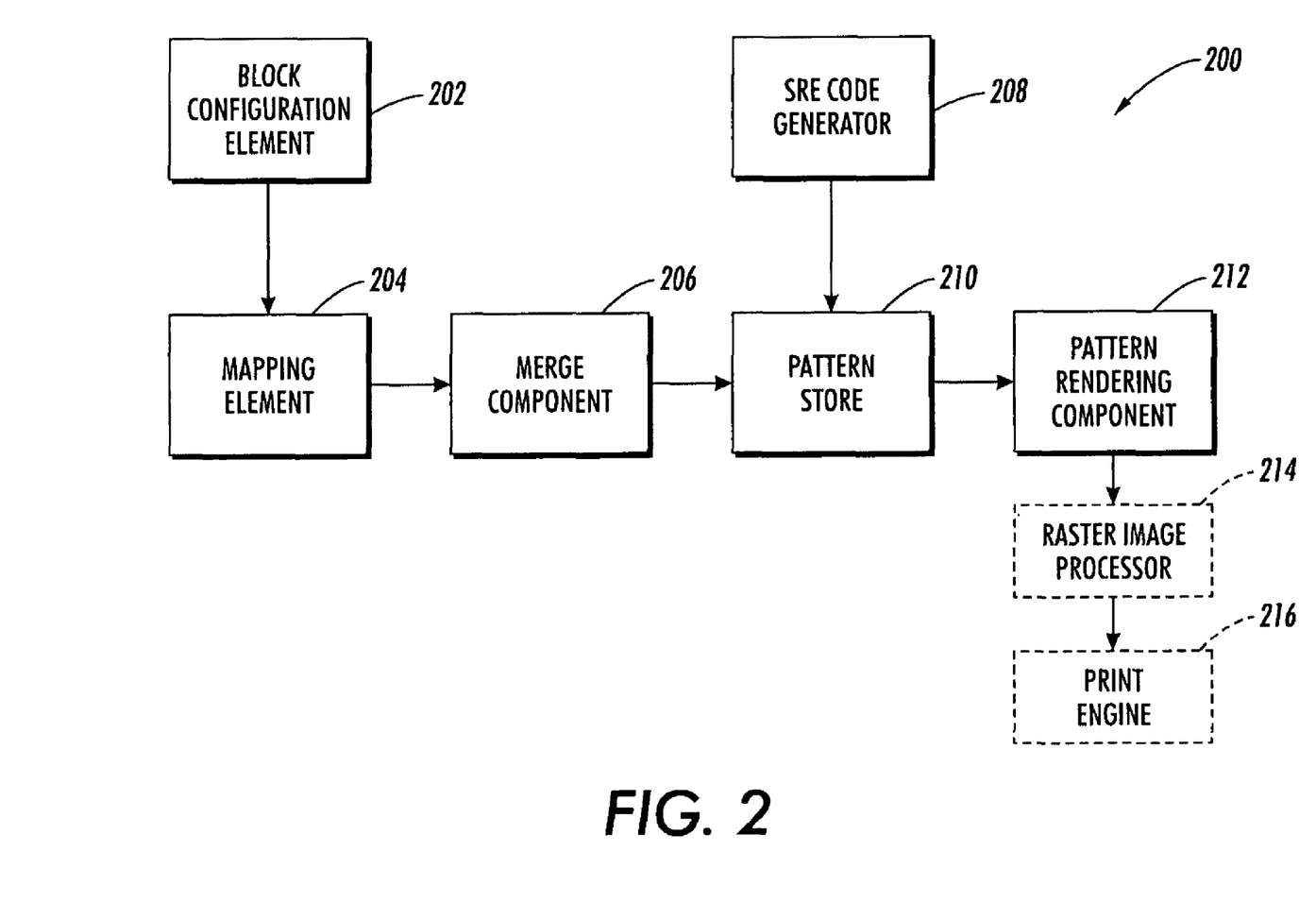
FIG. 2 illustrates a system that renders one or more halftone patterns employed in a print application, in accordance with an exemplary embodiment.

FIG. 2 illustrates a system 200 that is employed to render one or more halftone pattern employed in a print application. The system 200 includes a block configuration element 202, a mapping element 204, a merge component 206, an SRE code generator 208, and a pattern store 210, a pattern rendering component 212, a raster image processor 214, and a print engine 216. This system generates a plurality of blocks that are merged into supercells. The supercells contain one or more patterns which are associated with SRE codes. By merging the blocks into supercells, a greater but depth can be achieved to describe a larger set of patterns with a finite set of bits (e.g., eight, sixteen, etc.).

In an exemplary embodiment, one or more SRE codes can be distributed among groups of pixels, forming a "supercell" for SRE specification. In this manner, a greater number of bits can be used in the code specification. For example, assuming a 2×1 SRE supercell, 16 bits can be used for the SRE code specification, where the two 8 bit portions of the 16 bit code are distributed among the 2 SRE pixels. In one example, for the Xerox DC8000 2400 dpi SRE mode, a total of 232 possible patterns would exist for a 2×1 supercell. However, only a limited number is needed in practical situations, even in an application such as SRE halftoning, and the 16 bit code space is often more than adequate to describe complex cluster dots without pattern substitution. Supercell SRE provides a mechanism by which a greater number of meaningful SRE patterns can be effectively utilized.

The block configuration element 202 defines one or more blocks via a number of bits per block. A configuration can be created based on a particular font, pixel and/or rendering requirement (e.g., related to a print engine). The block can be substantially any shape. In one embodiment, the block is a rectangle with equal height and width. In other aspects, the block can have disparate sizes for a height and a width. The mapping element 204 places the one or more blocks in a predetermined configuration to create a dot defined by a rectangular font. One or more supercells are created via the merge component 206 by merging at least one set of adjacent blocks. In one aspect, the set of blocks is $2^N$, where N is an integer greater than or equal to one. By merging sets of two blocks together, the size of a bit string can be leveraged so that a greater number of patterns within the supercell (and the corresponding dots) can be employed and implemented.

The SRE code generator assigns an SRE code to each of the one or more patterns. The SRE code is related to the number and location of bits that are filled within the pattern. The super resolution encoding (SRE) code generator 208 can generate SRE codes associated with a particular desired pattern, which can be supported by a print engine. In one example, an SRE code is an eight bit number with an associated four by four bit pattern. An SRE code can provide a more granular resolution than available utilizing conventional means. For instance, utilizing SRE, an eight bit code at six hundred dots per inch (dpi) can represent a sixteen bit pattern at two thousand four hundred dpi.

In one example, the SRE codes are not available for all possible sixteen bit patterns. For instance, in a sixteen bit pattern (e.g., four by four bits), there are sixty five thousand five hundred and thirty six disparate patterns possible. However, in the interest of efficiency, a limited set can be utilized quite effectively. For clustered halftoning applications, the relative simplicity of most halftone designs can ameliorate the need for a large variety of possible patterns. In one approach, two hundred and fifty six patterns are available in a four by four bit field, wherein each pattern is associated with a particular SRE code. SRE codes can be considered a vector-quantization, where a sixteen bit number (four by four binary pixel) is represented by an eight bit number associated with the quantization vectors.

The SRE codes can be assigned to a bit pattern based upon the number of bits filled within a particular pattern. For example, SRE code '0' can have zero bits filled, code '45' can have four bits filled, SRE code '132' can have eight bits filled, etc. in a particular configuration. The SRE codes can be accessed and employed based upon what is needed for a particular text string.

The pattern store 210 defines one or more patterns within the one or more supercells by selecting one or more bits to be one of filled or unfilled within each supercell. In this manner, a plurality of patterns can be utilized based on the number of disparate patterns contained within each supercell. Once defined, the pattern rendering component 212 that renders a halftone pattern that includes a plurality of patterns, each pattern is included in the one or more supercells.

A raster image processor 214 can receive PostScript information and instruct a print engine on the type and location of one or more halftone dots. In this manner, a particular format and/or protocol is followed to incorporate the SRE code data into a form that is readily interpreted by a print engine. Such a print engine may require support of super resolution encoding and/or decoding to extract various information.

The raster image processor (RIP) 214 is a component that can produce a bitmap which is then sent to the print engine 216. The input may be a page description in a high-level description language such as PostScript, Portable Document Format, XPS or other bitmap of higher or lower resolution than the print engine. The RIP 214 can apply smoothing and/or interpolation algorithms to an input bitmap to generate an output bitmap. The RIP 214 can accomplish raster image processing to turn received vector digital information (e.g., a PostScript® file) into a high-resolution raster image. In other words, the RIP 214 can take digital information about fonts and graphics that describe the appearance of a file and translate it into an image composed of individual patterns that a print engine can output.

The RIP 214 can be implemented in substantially any manner. For example, the RIP 214 can be a software component of an operating system, hardware component, or a firmware program executed on a microprocessor inside a printer. A hardware RIP can be a dedicated component configured to process digital files. In one embodiment, the RIP 214 is employed in a laser printer as a chip that communicates raster images to a laser. In this manner, the RIP 214 receives vector digital information (e.g., a PostScript® file) from the font bank and transmits a set of instructions to the print engine 216.

The print engine 216 can be substantially any device that can print pages based on data received from one or more sources. The print engine 216 can be a platform that can print simplex and/or duplex pages with color, black and white, highlight color, etc. portions within each side of each page. In addition, the print engine 216 can include one or more independent modules (e.g., printers) that are interconnected in parallel and/or series to provide concurrent and/or serial processing of one or more jobs. Such modules may be independent in that each module is capable of processing a job(s) independently of the other modules. Each module can include one or more marking engines, and each marking engine can be associated with similar and/or different attributes (e.g., a processing rate, a type(s) of toner, etc).

The print engine 216 can accept instructions from the RIP 214 and output a document based on such received instructions. The instructions can be related to the placement, size, and frequency of one or more patterns on a document. Such pattern placement can be accomplished utilizing one or more processes known in the art. For example, a xerographic process can employ a charged roller to place toner in particular locations on a recipient (e.g., paper, velum, acetate, etc.). In this manner, data received by the print engine 216 can be output as a hardcopy representation of received data. Additionally, the print engine might be a component of a copier or similar device.

Figure 3:
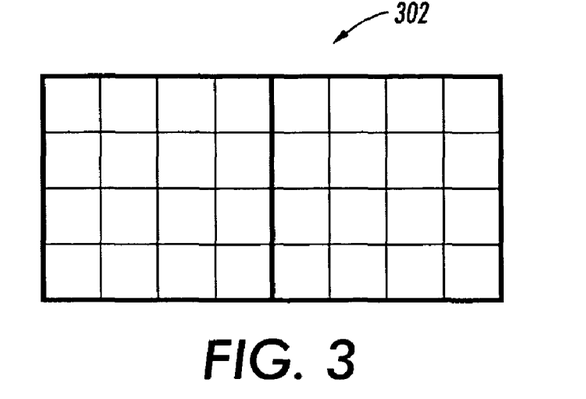
FIG. 3 illustrates an SRE supercell 302, in accordance with an exemplary embodiment.

FIG. 3 illustrates an SRE supercell 302. In this example, the supercell 302 is comprised of two 4×4 cells that are placed side by side to create a 4×8 supercell. In contrast to traditional SRE, the rendering code is distributed among groups of adjacent pixels, in order to achieve a larger bit depth. In this particular case, each 4×4 cell (corresponding to a single 600 dpi data pixel) can be assigned an 8 bit portion of the code. However, on the decoder end, the two 8 bit code portions can be combined to form a 16 bit SRE code, so that $2^{16}$ possible geometries can be specified. In this case there are also a larger number of possible patterns for this 8×4 block ($2^{32}$), although much fewer than this will actually be needed. In other words, even $2^{16}$ patterns can be more than sufficient for more sophisticated SRE applications such as halftoning.

Figure 4:
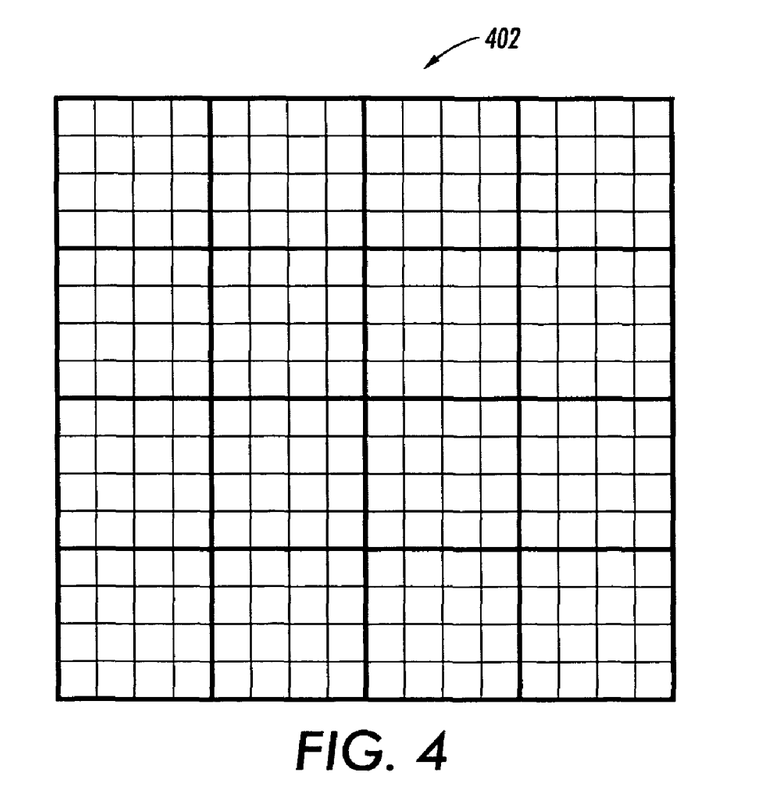
FIG. 4 illustrates a standard high resolution Holladay halftone grid designed for a 2400 dpi×2400 dpi binary rendering pattern, in accordance with an exemplary embodiment.

FIG. 4 illustrates a standard high resolution Holladay halftone dot grid 402 designed for a 2400 dpi×2400 dpi binary rendering pattern. In this embodiment, the halftone dot dimensions (width, height) are equal to (16, 16) which is subdivided into 4×4 SRE blocks. To create the corresponding SRE halftone (refer to U.S. patent application Ser. No. 11/443,016), one starts by taking the high-res dot, and tiling the SRE 4×4 window. For a general cluster dot or line screen, the growth will always occur in a regular fashion, where pixels will be filled adjacent to the existing dot cluster. Because of this, each 4×4 SRE cell will have only 15 (plus 2, all white and all black) possible patterns for all levels in the halftone dot, a general property for all cluster dot halftones. In this case, since there are a total of 15 (+2) 4×4 possible SRE patterns in each cell, therefore there will be a maximum of 15×16+2=242 unique geometries needed to describe this halftone using the SRE dot description. Therefore, the 8 bits would be sufficient to perfectly describe any height resolution halftone dot with the dimensions (16, 16) using SRE patterns, assuming one has the ability to specify the patterns to the decoder.

Figure 5:
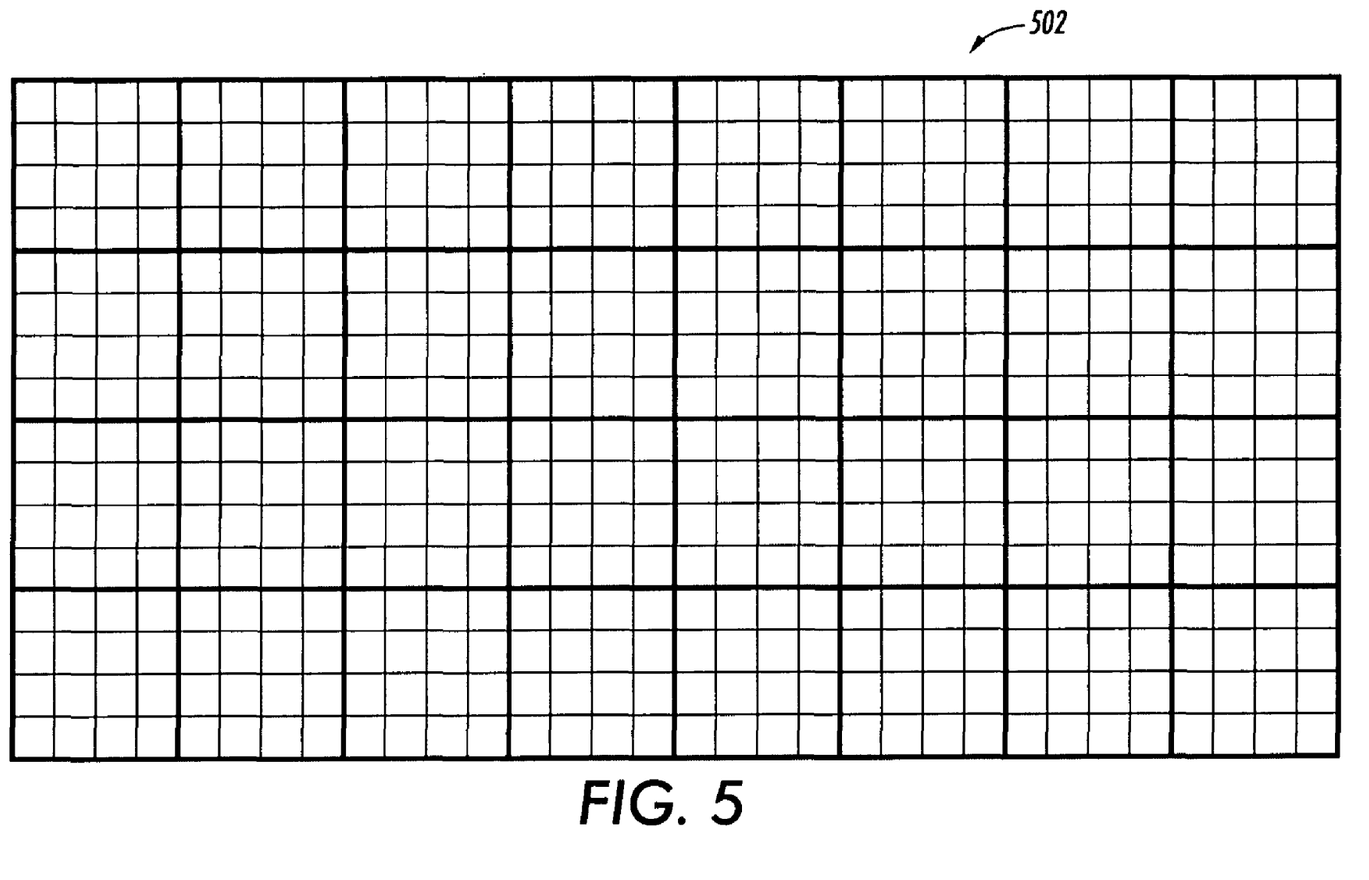
FIG. 5 illustrates a Holladay halftone grid with a dimension of 32×16 which is subdivided into 4×4 SRE subdivisions, in accordance with an exemplary embodiment.

FIG. 5 illustrates another Holladay halftone dot grid 502 with a dimension of 32×16 which is subdivided into 4×4 SRE cells. Because there are 32 4×4 SRE cells present, there will be a maximum of 32×15+2=482 unique pattern geometries possible, which exceeds 256 codes (e.g., the 8 bit limit for specifying SRE codes). In cases where exact patterns cannot be used, the desired pattern can be substituted for one that exists in the 256 element list of SRE patterns. In some cases, this can lead to objectionable artifacts such as contours or moiré.

Figure 6:
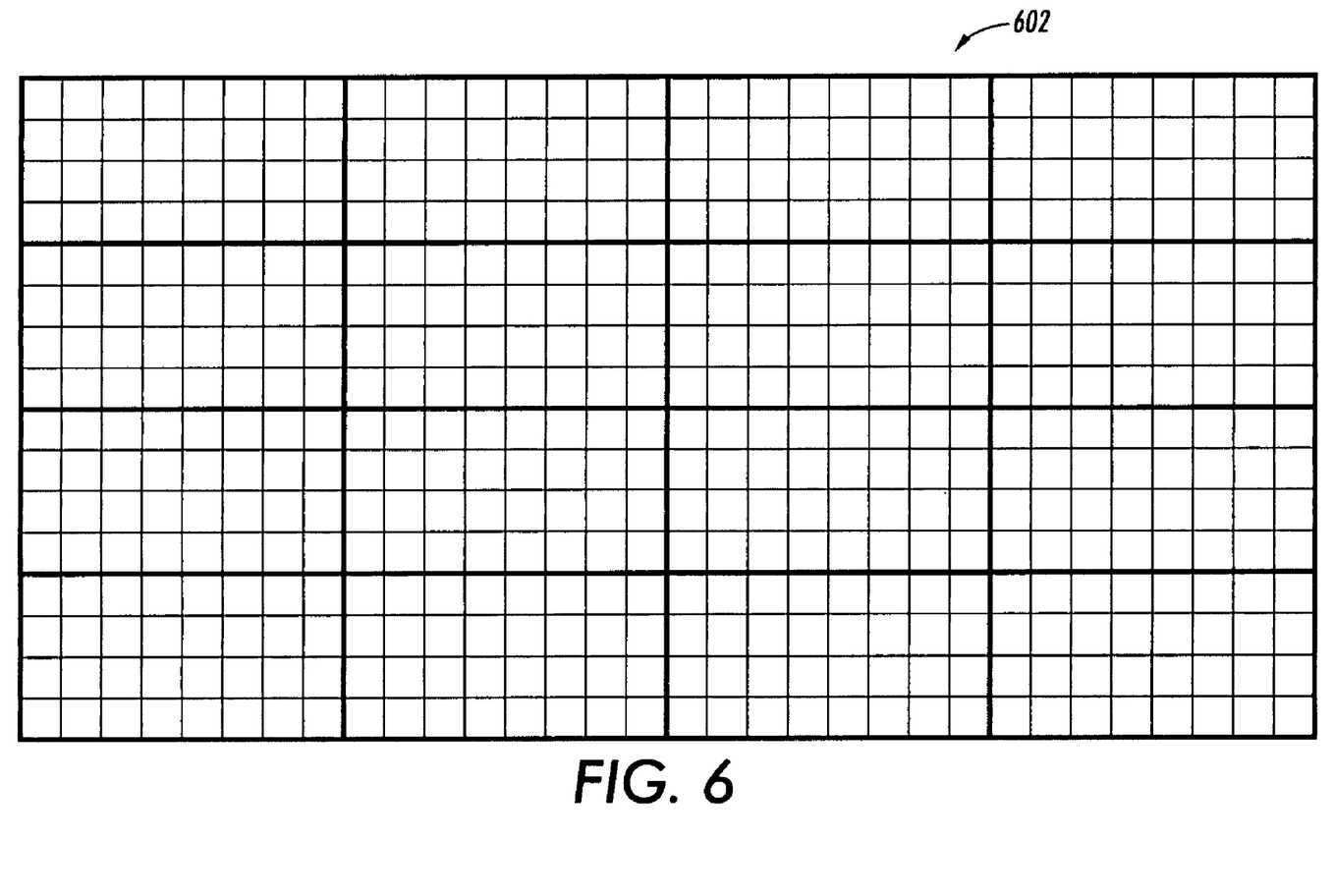
FIG. 6 illustrates a Holladay halftone grid subdivided into 2×1 supercell blocks with a dimension of 32×16, in accordance with an exemplary embodiment.

FIG. 6 illustrates a Holladay halftone dot grid 602 of dimension 32×16 subdivided into 2×1 supercell blocks similar to Holladay dot grid 502. However, the dot 602 is subdivided into 16 4×8 SRE supercells (instead of 32 4×4 cells). By utilizing SRE supercells, such that a 16 bit SRE code is distributed over two adjacent pixels, a total of 65,336 patterns are now available. In this new subdivision, there are now 32 sub-pixels in the supercell. As discussed previously, each 4×4 block will require a maximum of 15 (+2) patterns for description of the growth of the dot in that region; it follows that each 2×1 SRE supercell will require a maximum of 31 (+2) patterns, again a general result for the 2×1 supercell (with 32 sub-pixels). For the particular Holladay brick of this example, since there are 16 supercells, a maximum of 16×31+2=498 unique patterns can be required to perfectly describe an original high resolution halftone pattern. Note that this number of patterns can easily fit within the 16 bit space allocated for the supercell code. Hence, by using a supercell SRE approach, an exact description for the halftone dot in the SRE domain can be achieved. Note that by considering the supercell as two 4×4 cells, it is still possible to produce partial halftone dots at 2400×2400.

Figure 7:
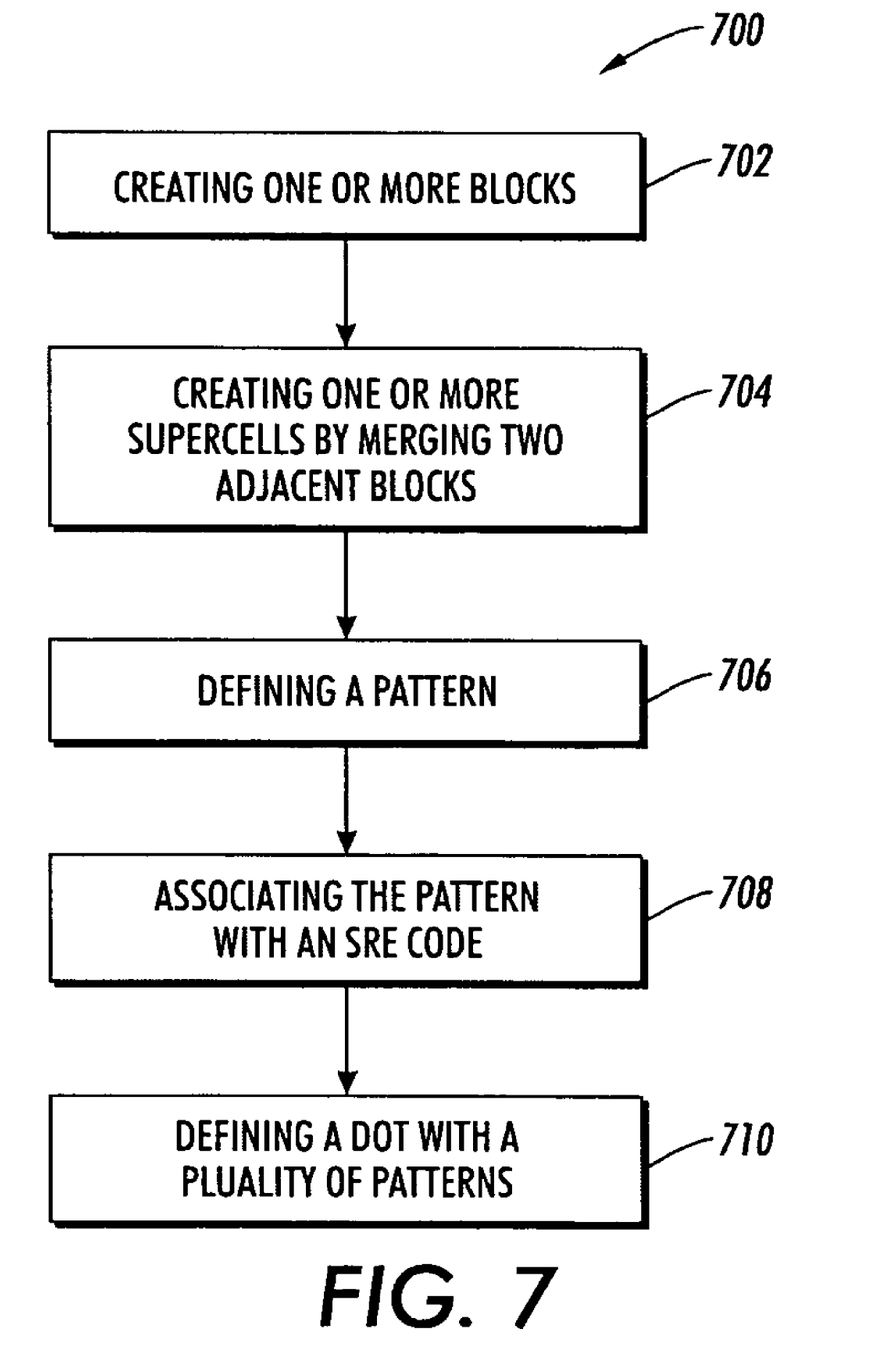
FIG. 7 illustrates a methodology to render a halftone pattern suitable for use with a print engine, in accordance with an exemplary embodiment.

FIG. 7 illustrates methodology 700 in accordance with subject embodiments. For simplicity of explanation, the methodologies are depicted and described as a series of acts. It is to be understood and appreciated that the subject embodiments are not limited by the acts illustrated and/or by the order of acts, for example acts can occur in various orders and/or concurrently, and with other acts not presented and described herein. Furthermore, not all illustrated acts may be required to implement the methodologies in accordance with the subject embodiments. In addition, those skilled in the art will understand and appreciate that the methodologies could alternatively be represented as a series of interrelated states via a state diagram or events.

FIG. 7 illustrates a method to render a halftone pattern suitable for use with a print engine. At 702, one or more blocks are created, wherein each block is comprised of a plurality of bits. The height of the block is equal to the width of the block. That is, an equal number of bits comprise the height and width of each of the one or more blocks. In one example, a block includes sixteen bits, wherein the block is four bits in height and four bits in width. At 704, one or more supercells are created by merging two adjacent blocks created at 702. The width of each of the one or more supercells is twice the height of each supercell. In one example, the adjacent blocks are located side-by-side, wherein the height of the supercell is four bits and the width of the supercell is eight bits.

At 706, one or more patterns are each defined by selecting one or more bits to be one of filled or unfilled within each supercell. FIG. 1 illustrates several examples of patterns 102-110 within a four by four block. At 708, each of the one or more patterns is associated with an SRE code. The SRE code is related to the number and location of bits that are filled within a pattern. For example, pattern 104 in FIG. 1 is associated with the SRE code 064. At 710, a halftone dot pattern is defined with a plurality of patterns, wherein each pattern is included in the one or more supercells.

An extension to the super-resolution encoding/decoding method has been described. In this approach, the SRE code is distributed among neighboring pixels, in order to achieve an extended code bit width, and therefore expand the number of available patterns. In this document, a 2×1 supercell was described, although other supercell sizes could be used, for example 2×2. This approach can be beneficial when applied to complex SRE applications such as SRE halftoning.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-based method that creates patterns using a super resolution encoding method that distributes the code value among adjacent pixels, comprising:
    a processor that creates one or more blocks, wherein each block is comprised of a plurality of bits, the height of the block is equal to the width of the block;
    creating one or more supercells by merging at least two adjacent blocks, each block comprising a plurality of bits, wherein said plurality of bits from each block are combined and distributed throughout the supercell, creating a single supercell having a greater number of bits than either block individually;
    defining one or more bit patterns, wherein the each pattern is defined by selecting one or more bits to be one of filled or unfilled within each supercell, wherein merging at least two adjacent blocks increases the number of the possible bit patterns;
    associating each of the one or more patterns bit with an SRE code, wherein the SRE code represents bits and at least two portions of the bits are distributed in the bit patterns in the supercell and wherein the SRE code is sixteen bits number, wherein two eight bit portions of the sixteen bits number are distributed among groups of pixels in the supercell; and
    defining a halftone bit pattern with a plurality of bit patterns, and the each bit pattern is included in the one or more supercells.

2. The method according to claim 1, wherein each of the one or more blocks is comprised of sixteen bits, the height of the block is four bits and the width of the block is four bits.

3. The method according to claim 2, wherein the possible number of patterns in each of the one or more blocks is seventeen.

4. The method according to claim 1, wherein each of the one or more supercells is comprised of thirty two bits, the height of the supercell is four bits and the width of the supercell is eight bits.

5. The method according to claim 4, wherein the supercell can include one or more of 65,336 patterns.

6. The method according to claim 1, further including:
    rendering the pattern via the print engine.

7. A computer-based method that creates patterns using a super resolution encoding method that distributes the code value among adjacent pixels, comprising:
    a processor that creates one or more blocks, wherein each block is comprised of a plurality of bits, the height of the block is equal to the width of the block;
    creating one or more supercells by merging at least two adjacent blocks;
    defining one or more bit patterns, wherein the each pattern is defined by selecting one or more bits to be one of filled or unfilled within each supercell, wherein merging at least two adjacent blocks increases the number of the possible hit patterns;
    associating each of the one or more bit patterns with an SRE code, wherein the SRE code represents bits pattern and at least two portions of the bits are distributed in the bit patterns in the supercell and wherein the SRE code is sixteen bits number, wherein two eight bit portions of the sixteen bits number are distributed among groups of pixels in the supercell; and
    defining a halftone bit pattern with a plurality of hit patterns, and the each bit pattern is included in the one or more supercells.

8. A computer-based method that renders a pattern suitable for use with a print engine, comprising:
    a processor that creates one or more blocks, wherein each block is comprised of a plurality of bits;
    creating one or more supercells by merging at least two blocks, each block comprising a plurality of bits, wherein said plurality of bits from each block are distributed throughout the supercell, forming a single supercell having a greater number of bits than either block individually;
    defining one or more bit patterns, wherein the each pattern is defined by selecting one or more bits to be one of filled or unfilled within each supercell, wherein merging at least two adjacent blocks increases the number of the possible bit patterns;
    associating each of the one or more bit patterns with an SRE code, wherein the SRE code represents bits and at least two portions of the bits are distributed in the bit patterns in the supercell and wherein the SRE code is sixteen bits number, wherein two eight bit portions of the sixteen bits number are distributed among groups of pixels in the supercell; and
    defining a halftone bit pattern with a plurality of bit patterns, and the each bit pattern is included in the one or more supercells.

9. The method according to claim 8, wherein each of the one or more blocks is comprised of sixteen bits, the height of the block is four bits and the width of the block is four bits.

10. The method according to claim 9, wherein each supercell is comprised of two blocks in height and two blocks in width.

11. The method according to claim 9, wherein each supercell is comprised of 2× blocks in height and Y blocks in width, where X and Y are both integers greater than or equal to one.

12. The method according to claim 8, wherein each of the one or more supercells is comprised of sixty four bits, the height of the supercell is eight bits and the width of the supercell is eight bits.

13. The method according to claim 8, wherein the SRE code can represent one of $2^{32}$ patterns.

14. The method according to claim 8, wherein the SRE code can represent $2^N$ patterns, where N is equal to one half the number of bits within each of the one or more supercells.

15. The method according to claim 8, wherein each of the one or more supercells is comprised of thirty two bits, the height of the supercell is two bits and the width of the supercell is sixteen bits.

16. The method according to claim 8, wherein each of the one or more blocks is comprised of eight bits, the height of the block is eight bits and the width of the block is one bit.

17. The method according to claim 8, wherein each of the one or more blocks is comprised of four bits, the height of the block is two bits and the width of the block is two bits.

18. A system that creates patterns using a super resolution encoding method that distributes the code value among adjacent pixels, comprising:
- a block configuration element that creates one or more blocks, wherein each block is comprised of a plurality of bits;
- a merge component that creates one or more supercells by merging at least two blocks, each block comprising a plurality of bits, wherein said plurality of bits from each block are distributed throughout the supercell, such that each supercell has a greater number of bits than either block individually;
- a pattern store that defines one or more bit patterns, wherein the each pattern is defined by selecting one or more bits to be one of filled or unfilled within each supercell wherein a merge of at least two adjacent blocks increase the number of the possible bit patterns;
- an SRE code generator that associates each of the one or more patterns with an SRE code, wherein the SRE code represents bits and at least two portions of the bits are distributed in the bit patterns in the supercell and wherein the SRE code is sixteen bits number, wherein two eight bit portions of the sixteen bits number are distributed among groups of pixels in the supercell; and
- a pattern rendering component that defines a halftone bit pattern with a plurality of bit patterns, and the each bit pattern is included in the one or more supercells.

19. A computer-based method that creates patterns using a super resolution encoding method that distributes the code value among adjacent pixels, comprising:
- a processor that creates one or more blocks, wherein each block is comprised of a string of bits, the height of the block is equal to the width of the block;
- creating one or more supercells by merging at least two adjacent ones of the blocks, each block comprising a string of bits, wherein said string of bits from each block are combined and distributed throughout the supercell, creating a single supercell having a greater number of bits than either block individually;
- defining one or more bit patterns, wherein the each pattern is defined by selecting one or more bits to be one of filled or unfilled within each supercell, wherein merging at least two adjacent blocks increases the number of the possible bit patterns;
- associating each of the one or more bit patterns with an SRE code, wherein the SRE code represents bits and at least two portions of the bits are distributed in the hit patterns in the supercell and wherein the SRE code is a sixteen bits number, wherein two eight bit portions of the sixteen hits number are distributed among groups of pixels in the supercell; and
- defining a halftone bit pattern with a plurality of bit patterns, and the each bit pattern is included in the one or more supercells.

* * * * *